(12) United States Patent
Sipes, Jr.

(10) Patent No.: US 11,342,723 B2
(45) Date of Patent: May 24, 2022

(54) COUNTER PUMPING A LARGE MODE AREA FIBER LASER

(71) Applicant: OPTICAL ENGINES, INC., Colorado Springs, CO (US)

(72) Inventor: Donald Lee Sipes, Jr., Colorado Springs, CO (US)

(73) Assignee: OPTICAL ENGINES, INC., Colorado Springs, CO (US)

( * ) Notice: Subject to any disclaimer, the term of this patent is extended or adjusted under 35 U.S.C. 154(b) by 422 days.

(21) Appl. No.: 16/513,191

(22) Filed: Jul. 16, 2019

(65) Prior Publication Data

US 2020/0099192 A1 Mar. 26, 2020

Related U.S. Application Data

(60) Provisional application No. 62/794,257, filed on Jan. 18, 2019, provisional application No. 62/698,489, filed on Jul. 16, 2018.

(51) Int. Cl.

| | |
|---|---|
| *H01S 3/094* | (2006.01) |
| *H01S 3/067* | (2006.01) |
| *H01S 3/06* | (2006.01) |
| *H01S 3/0941* | (2006.01) |
| *H01S 3/23* | (2006.01) |

(52) U.S. Cl.
CPC ...... *H01S 3/094053* (2013.01); *H01S 3/0621* (2013.01); *H01S 3/06745* (2013.01); *H01S 3/06754* (2013.01); *H01S 3/09415* (2013.01); *H01S 3/094003* (2013.01); *H01S 3/2333* (2013.01)

(58) Field of Classification Search
None
See application file for complete search history.

(56) References Cited

U.S. PATENT DOCUMENTS

| | | | |
|---|---|---|---|
| 4,900,114 A | 2/1990 | Mortimore et al. | |
| 6,236,793 B1 * | 5/2001 | Lawrence | H01S 3/063 385/132 |
| 6,275,627 B1 | 8/2001 | Wu | |
| 6,324,326 B1 | 11/2001 | Dejneka et al. | |
| 6,826,335 B1 * | 11/2004 | Grudinin | B82Y 20/00 359/341.3 |
| 8,089,689 B1 * | 1/2012 | Savage-Leuchs | H01S 3/0675 359/341.1 |

(Continued)

FOREIGN PATENT DOCUMENTS

| | | |
|---|---|---|
| JP | 02015040992 A1 | 3/2015 |
| WO | WO 2015/117128 A1 | 8/2015 |

OTHER PUBLICATIONS

U.S. Appl. No. 15/192,389, filed Jun. 24, 2016.

(Continued)

*Primary Examiner* — Eric L Bolda
(74) *Attorney, Agent, or Firm* — Leydig, Voit & Mayer, Ltd.

(57) ABSTRACT

A fiber optic assembly includes: a gain fiber configured to output signal light; a first taper configured to expand the signal light output by the gain fiber; and a reversing prism configured to receive counter-pumping light and output the counter-pumping light into the first taper. The first taper is further configured to direct the counter-pumping light towards the gain fiber.

20 Claims, 9 Drawing Sheets

(56) References Cited

U.S. PATENT DOCUMENTS

| | | |
|---|---|---|
| 8,773,755 B2 | 7/2014 | Nishihara et al. |
| 9,667,023 B2 * | 5/2017 | Fomin ............... H01S 3/067 |
| 10,348,051 B1 * | 7/2019 | Shah ................. G01S 17/34 |
| 2003/0016441 A1 | 1/2003 | Leplingard et al. |
| 2005/0122574 A1 | 6/2005 | Kakui et al. |
| 2007/0115541 A1 | 5/2007 | Rogers et al. |
| 2008/0219299 A1 | 9/2008 | Lewis |
| 2009/0080469 A1 * | 3/2009 | Nikolajsen ........ H01S 3/094003 372/6 |
| 2010/0195678 A1 * | 8/2010 | Kuka ................. H01S 3/06708 372/6 |
| 2011/0032604 A1 | 2/2011 | Rothenberg et al. |
| 2011/0141758 A1 * | 6/2011 | Seo ................... H01S 3/094019 362/553 |
| 2011/0249321 A1 | 10/2011 | Savage-Leuchs |
| 2013/0301663 A1 * | 11/2013 | Clowes ............... H01S 3/067 372/6 |
| 2015/0138630 A1 | 5/2015 | Honea et al. |
| 2016/0380403 A1 | 12/2016 | Sipes |
| 2020/0099192 A1 | 3/2020 | Sipes, Jr. |

OTHER PUBLICATIONS

International Search Report and Written Opinion for co-pending International Application No. PCT/US2020/20170, dated Jun. 24, 2020.

\* cited by examiner

COUNTER PUMPING A LARGE MODE AREA FIBER LASER

CROSS-REFERENCE TO RELATED APPLICATIONS

This application claims the benefit of U.S. Provisional Application No. 62/698,489, filed on Jul. 16, 2018, and U.S. Provisional Application No. 62/794,257, filed on Jan. 18, 2019, both of which are hereby incorporated by reference in their entireties.

STATEMENT REGARDING FEDERALLY SPONSORED RESEARCH OR DEVELOPMENT

This invention was made with Government support under contract SBIR Phase 2 Contract SC0015905 awarded by the Department of Energy. The Government has certain rights in this invention.

BACKGROUND

Fiber lasers are becoming increasingly deployed in industrial, scientific, medical, and defense applications due to their high efficiency, robust and reliable construction, and their relatively low system size and weight. Pulsed fiber lasers, such as ultrafast fiber lasers, are of interest. Furthermore, pulsed fiber lasers can create femtosecond (fs) level pulses in small, rugged and reliable packages. Fiber nonlinearities, such as stimulated Brillouin scattering (SBS), Raman scattering, and self-phase modulation (SPM), act as impediments to realizing higher peak powers and even shorter pulse widths.

SUMMARY

In an exemplary embodiment, the present disclosure provides a fiber optic assembly. The fiber optic assembly includes: a gain fiber configured to output signal light; a first taper configured to expand the signal light output by the gain fiber; and a reversing prism configured to receive counter-pumping light and output the counter-pumping light into the first taper. The first taper is further configured to direct the counter-pumping light towards the gain fiber.

In another exemplary embodiment, the present disclosure provides a fiber amplifier system. The fiber amplifier system includes: an amplifier front end configured to pre-amplify light from a seed source and output the pre-amplified light to a first section of gain fiber; a first mode adapter configured to connect the first section of gain fiber to a second section of gain fiber; a laser diode pump for providing counter-pumping light through a pump fiber; and a reversing prism assembly for directing the counter-pumping light from the pump fiber towards the first and second sections of gain fiber.

In yet another exemplary embodiment, the present disclosure provides a fiber amplifier array. The fiber amplifier array includes: a plurality of sleeves, wherein each sleeve comprises a gain fiber and a first taper; a plurality of interstitial spaces disposed between respective sleeves of the plurality of sleeves; and a plurality of reversing prisms. Each reversing prism is configured to direct counter-pumping light from at least respective one interstitial space to at least one respective first taper.

DETAILED DESCRIPTION

Ameliorating the effects of SBS, Raman scattering, and SPM generally involves utilizing rare-earth-doped gain fibers with large mode area (LMA) fiber cores where the light is guided and amplified. It can be desirable for these ultrafast fiber laser systems to employ all-fiber architectures whereby the only free space beam resides at the output of the fiber laser. Also, ultrafast fiber lasers and fiber lasers in general perform more efficiently and with higher non-linear thresholds when the pump light propagates in the opposite direction to the signal propagation (referred to as "counter pumping").

Ultrafast fiber lasers are sensitive to SPM. This effect usually occurs when a signal pulse is at its highest intensity at the output end of a fiber laser. In monolithic or all-fiber co-pumped configurations and in free space counter pumped arrangements, the amount of fiber past the amplifying gain fiber can be very short, e.g., under 10 mm. While having a short amount of fiber after the gain fiber is advantageous, co-pumped amplifiers suffer from lower efficiency and lower non-linearity thresholds compared to counter pumped amplifiers. Counter pumped configurations can achieve 3 dB more average power output or intensity before onset of non-linearity compared to co-pumped configurations.

Conventional counter pumped ultrafast amplifiers have large fiber pump coupling optics and mounting hardware and require large, stable and heavy optical benches for holding the pump fibers and guiding the pump light into the end of the fiber amplifier. Alternatively, monolithic counter pumped fiber lasers can have up to 20 cm of fiber past the gain fiber for the fiber pump combiner, the output fiber, and any other transition fibers. An indicator commonly used for characterizing pulsed lasers is the "B Integral," which corresponds to the integral of the intensity times the nonlinear index. Having 20 cm of non-gain fiber adds to the B Integral without adding any value from an amplification standpoint. Therefore, a monolithic counter pumped fiber laser designed as such has a disadvantage of increasing pulse width.

Embodiments of the disclosure provide counter pumped amplifier architectures having the compactness and reliability of monolithic designs. Embodiments of the disclosure also achieve counter pumping in an architecture where a large number of ultrafast fiber amplifiers are contained with their outputs in a closely packed 2-D array. Embodiments of the disclosure avoid having free space and therefore avoid the need for heavy optical benches for holding components together.

Figure 1:
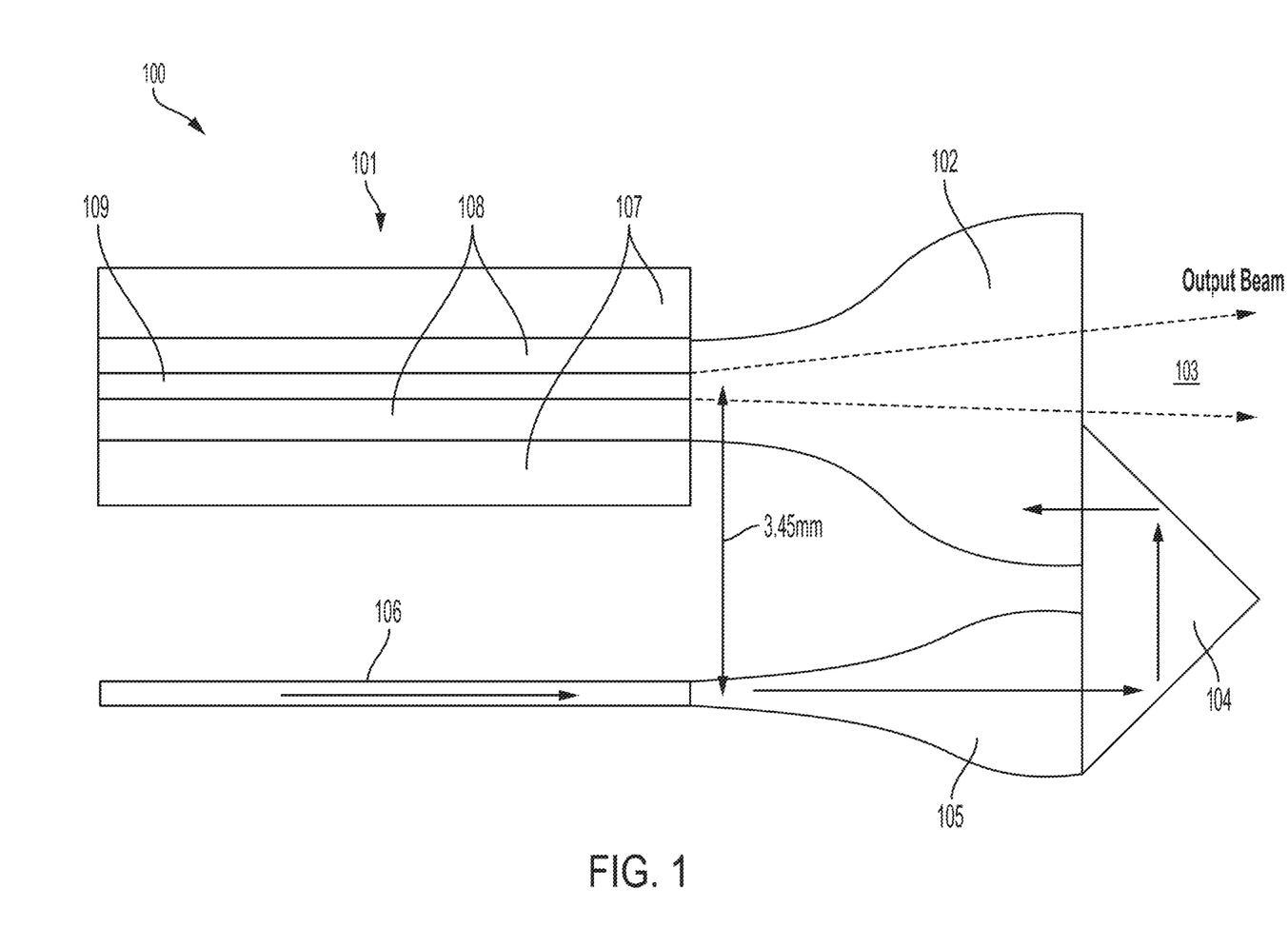
FIG. 1 illustrates a fiber optic assembly for counter pumping according to an embodiment of the disclosure.

FIG. 1 illustrates a fiber optic assembly 100 for counter pumping according to an embodiment of the disclosure. The fiber optic assembly 100 can be used in a fiber laser (e.g., having fiber Bragg grating (FBG) mirrors on both ends of the gain fiber to create an oscillator) or a fiber amplifier application (e.g., having a signal on the input). In an embodiment, the fiber optic assembly 100 comprises a double-clad gain fiber 101 of an amplifier. The gain fiber 101 can be an LMA fiber with a core 109, a pump cladding 108 (also called an "inner cladding"), and a buffer 107 (also called an "outer cladding"). The core 109 of the gain fiber 101 may be rare-earth-doped. The buffer 107 may be made of glass or polymer, or the buffer 107 could be removed or be basically air (typically for practical purposes having air as the buffer 107 would only be feasible for a few cm due to concerns about contamination). The diameter of the core 109 of the gain fiber 101 can be classified as LMA when the diameter is substantially larger than the 6 µm to 9 µm core diameters found in single mode fibers (SMF). The substantially larger LMA diameters can be achieved through a number of ways, e.g., by precise control of index of refraction (index) between the core (e.g., the core 109) and the cladding (e.g., pump cladding 108) of the fiber, or through a microstructured fiber, such as a photonic crystal fiber (PCF), a photonic bandgap fiber (PBG), or through other methods, such as a Chirally-Coupled Core (3C) fiber. These aforementioned modes of achieving LMA type fibers allow for large propagating modes in the fiber favorable to the lowest order or fundamental propagating mode of the fiber. The fiber optic assembly 100 in FIG. 1 further includes a first taper 102 (e.g., a tapered fiber or a tapered glass rod). The first taper 102 has a diameter on its smaller end that matches the diameter of the pump cladding 108 of the gain fiber 101.

As depicted in FIG. 1, the tapered design of the first taper 102 allows the amplified signal light out of the core 109 of the gain fiber 101 to expand naturally as determined by the numerical aperture (NA) of the gain fiber 101. The output beam 103 from the gain fiber 101 exits the core 109, grows within the first taper 102, and exits the first taper 102. The first taper 102 can be tapered either by thermal tapering or by acid etching such that pump light entering from its right is guided by the first taper 102 to the pump cladding 108 of the gain fiber 101. Both the pump cladding 108 and the buffer 107 may form a guiding structure for pump light with respect to the gain fiber 101.

Pump light is delivered to the gain fiber 101 in a counter pumping configuration from a pump diode by way of a pump fiber 106. A second taper 105 increases the diameter of the core of pump fiber 106 and reduces the NA in accordance with the law of conservation of brightness. The second taper 105 can also be a tapered fiber or a tapered glass rod. The expanded pump light out of the second taper 105 is directed through a reversing prism 104 to direct the pump light through the first taper 102 into the pump cladding 108 of the gain fiber 101. The reversing prism 104 may be a commercially available micro prism utilizing total internal reflection to both reverse and offset the pump light. The sizes and orientations of the second taper 105, the first taper 102, and the reversing prism 104 are configured such that the output beam 103 is not impeded by the reversing prism 104.

The fiber optic assembly 100 in FIG. 1 directs pump light from the pump fiber 106 into the gain fiber 101. As discussed above, the gain fiber 101 is double-clad and may include a rare-earth-doped core where the signal propagates and a pump cladding 108 that contains and propagates pump light. The pump light internally reflects and distributes around in the pump cladding 108, passing periodically through the rare-earth-doped core 109 where it is absorbed. Most double-clad fibers have cladding absorptions anywhere between 1 and 10 db/m.

In conventional methods involving pulsed lasers with advanced large mode area gain fibers such as photonic crystal fibers, the pump light is coupled into the gain fiber using 2 lenses. One lens is positioned after the pump fiber to collimate the pump light, and the other lens is positioned near the gain fiber to focus the pump light into the gain fiber. Through the law of conservation of brightness, when light in a fiber is tapered such that the diameter increases, the numerical aperture (NA) decreases. In the embodiment of FIG. 1, the first and second tapers 102, 105 act as non-imaging lenses for collimating and focusing the light. As such, replacing conventional lenses with the first and second tapers 102, 105 provides a major difference because lenses image light while tapered fibers or tapered glass rods concentrate light.

In an exemplary implementation, the second taper 105 starts as a commercially available 400/440 um 0.22 NA multimode fiber that is then tapered to a 105 um core diameter and spliced to a 105/125 um 0.15 NA pump fiber from the pump diode. Pump light from the diode is at 105 um and 0.15 NA. The second taper 105 changes this to 400 um and 0.05 NA. The first taper 102 takes this to 200 um and 0.55 NA. The first taper 102 is a 1.5 mm/1.6 mm fiber tapered to 200 um.

The expanding and concentrating process is governed through the etendue of the light, which corresponds to the NA times the diameter for an optical system that is symmetric cylindrically about the propagation axis. In an exemplary implementation, the pump light travels in a 105 µm fiber diameter with an NA of 0.15. The etendue is defined as the radius times the solid angle of the light emission, but in a cylindrically symmetric geometry, the etendue can be determined as the diameter times the NA. The pump diameter-NA product for the 105 µm fiber with 0.15 NA is 15.75. A double-clad gain fiber with a diameter of 200 µm with a NA of 0.55 provides a product of 110. Since 15.75 is less than 110, the pump light should be able to be focused into the gain fiber pump cladding with 100% efficiency. The tapers serve to exchange diameter for NA while preserving the pump diameter-NA product. In an embodiment, the second taper 105 takes the 105 µm/0.15 NA pump light from the pump fiber 106 to 400 um/0.04 NA, and the first taper 102 takes the 200 µm/0.55 NA signal light from the gain fiber 101 to 1.6 mm/0.07 NA. Therefore, the output of the second taper 105 can be abutted against the first taper 102, and all the pump light will go into the pump cladding 108 of the gain fiber 101. The reversing prism 104 provides convenience of placing the two fibers parallel to each other.

An advantage provided over conventional lens implementations is that lenses have to be positioned accurately and are susceptible to motion, but by using the geometry of the tapers, which may be tapered fibers or tapered glass rods, embodiments of the disclosure can very accurately and stably direct the pump light into the gain fiber. The fiber optic assembly 100 of FIG. 1 is amenable to a monolithic structure where the pump light completely or mostly does not leave the fiber, and all the fibers are spliced together. Although not strictly monolithic, embodiments of the disclosure have properties associated with monolithic structures.

The fiber optic assembly 100 in FIG. 1, according to some embodiments of the disclosure, provides several advantages. For example, the first taper 102 positioned after the gain fiber 101 can be designed to be very short, e.g., about 5 mm to 10 mm. Very short glass lengths can minimize the amount of SPM experienced and can increase the non-linearity thresholds. Non-linearity thresholds are increased because compared to light guided by fiber, the light entering the first taper 102 expands through diffraction instead of being confined by the structure of the gain fiber 101. To give another example, embodiments of the disclosure provide a compact design that is amenable to placing fiber amplifiers in densely packed 2-D arrays for coherent or wavelength combining. Furthermore, embodiments of the disclosure utilize an output taper, e.g., the first taper 102, that does not have light guiding properties. As such, the fiber optic assembly 100 can work with a number of different fibers without having to create specialty matching fibers.

FIG. 1 illustrates counter pumping with a single fiber, but it will be appreciated that the fiber optic assembly 100 in FIG. 1 can be adapted to accommodate multiple fiber pumps and reversing prisms surrounding a central beam. For example, in another exemplary embodiment, additional pump fiber(s), taper(s), and reversing prism(s) (similar to elements 106, 105 and 104 of FIG. 1, which are below output beam 103) can be added above and/or on the sides of output beam 103.

In an embodiment, the reversing prism 104 can be eliminated and the pump laser can be pointed directly at the output end of the first taper 102. With respect to FIG. 1, the reversing prism 104 can be removed and the second taper 105 and the pump fiber 106 are rotated 180 degrees and positioned at the bottom of the first taper 102.

In another exemplary embodiment, a second pump turning prism opposing the first one may be added, so as to double the available pumping power.

Multiple methods can be adopted to reduce or eliminate back reflections. For example, optically contacting the elements identified in FIG. 1 can eliminate back reflections. In another example, the elements may be fused together by heating the elements in an optical fiber splicing machine or equivalent device. Light is in "free space" between the second taper 105 and the reversing prism 104 (which may be on the order of microns apart), and between the reversing prism 104 and the first taper 102. Thus, methods for reducing back reflections at these two interfaces can involve putting anti-reflective (AR) coatings on these surfaces or putting them in optical contact (basically touching each other). Connections between the gain fiber 101 and the first taper 102 and between the second taper 105 and the pump fiber 106 are spliced and do not require elimination of back reflections.

In an embodiment, the gain fiber 101 is PCF rod fiber with polarization-maintaining characteristics having an 85 µm core diameter and a 250 µm pump cladding diameter. The first taper 102 is a 1.5 mm to 2 mm fused silica rod tapered to 250 µm and spliced to the PCF rod fiber. Adiabatic or near adiabatic taper of the first taper 102 transforms the 250 µm 0.55 NA pump cladding to a 1.5 mm 0.09 NA cladding. The pump fiber 106 is spliced to the second taper 105 that increases from the 105 µm 0.15 NA core diameter of the pump fiber 106 to a 400 µm 0.04 NA output. The reversing prism 104 has anti-reflective (AR) coating on its long face and is aligned such that the light from the pump fiber 106 goes into the gain fiber 101 with high efficiency.

Figure 2:
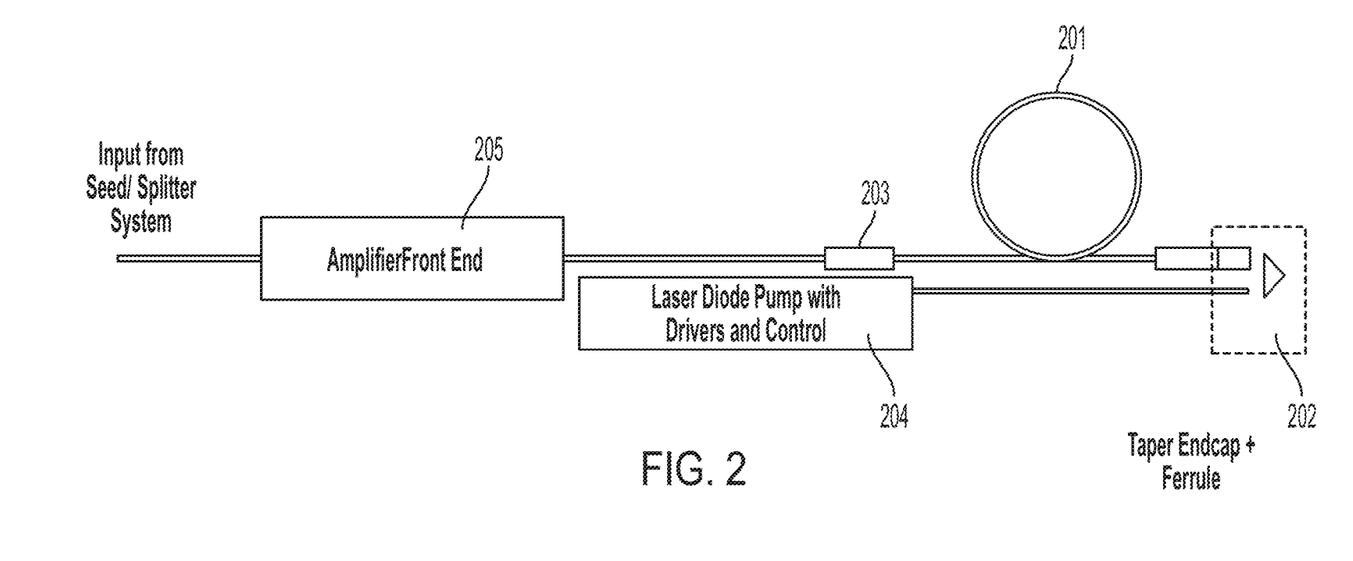
FIG. 2 illustrates an amplifier incorporating counter pumping according to an embodiment of the disclosure.

FIG. 2 illustrates an amplifier incorporating counter pumping according to an embodiment of the disclosure. In the amplifier, light from a seed source is pre-amplified in an amplifier front end 205 through a fiber, e.g., a single mode fiber. A mode adapter 203 transforms the core light to match a larger core PCF fiber 201. The larger core PCF fiber 201 can be, for example, a 40 µm Yb-doped polarizing fiber. The core light travels through the larger core PCF fiber 201 and then out of a tapered end cap with a reversing prism assembly 202. The reversing prism assembly 202 includes a first taper, a reversing prism, and a second taper as previously described in FIG. 1. The laser pump light is pumped in a counter propagating fashion by a laser diode pump with drivers and control 204. Examples of mode adapters for matching two types of fibers can be found in U.S. patent application Ser. No. 15/192,389, which is hereby incorporated by reference in its entirety.

Figure 3:
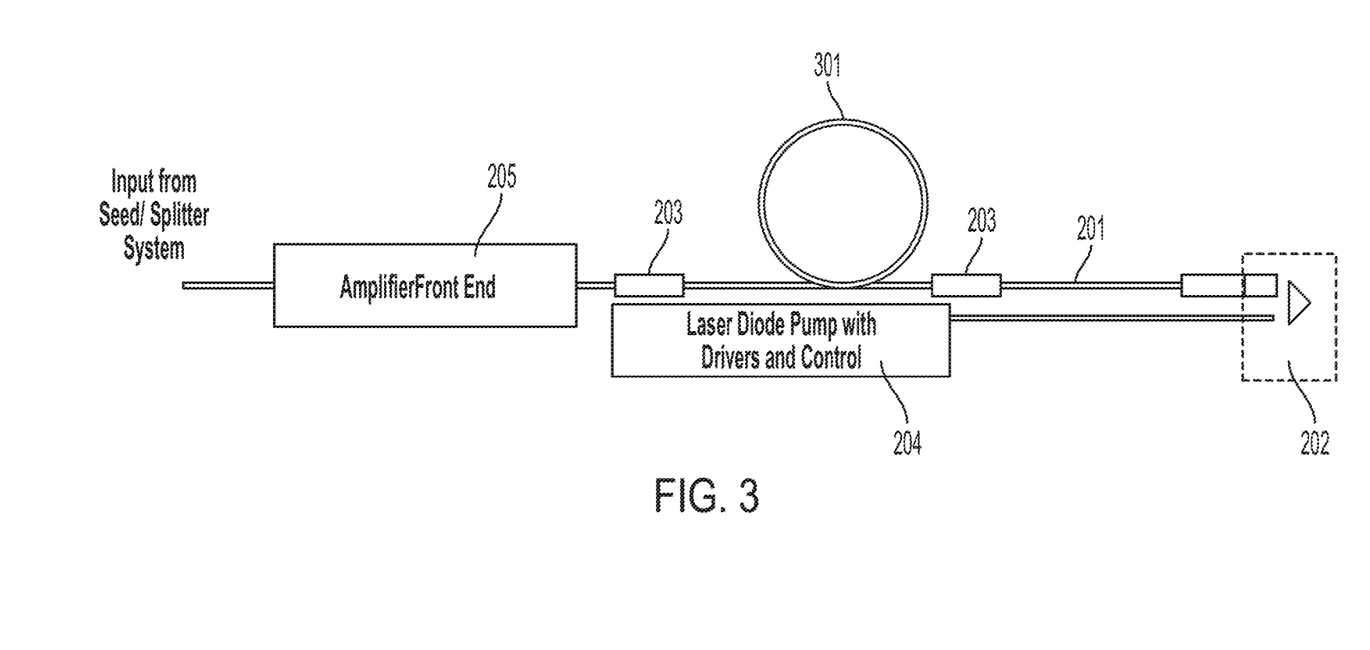
FIG. 3 illustrates another amplifier incorporating counter pumping according to an embodiment of the disclosure.

PCF-type fibers are generally a factor of 5 to 10 times higher in cost than normal large mode area gain fibers. In order to reduce the cost of building the amplifier of FIG. 2, a composite-type fiber like the one shown in FIG. 3 can be created. In FIG. 3, the length of PCF fiber 201 is reduced considerably, e.g., from 1.5 m to around 30 cm. An LMA fiber 301, e.g., a 20 µm core 125 µm double clad Yb doped fiber, acts as a pre amplifier to the shortened PCF fiber 201.

Figure 4:
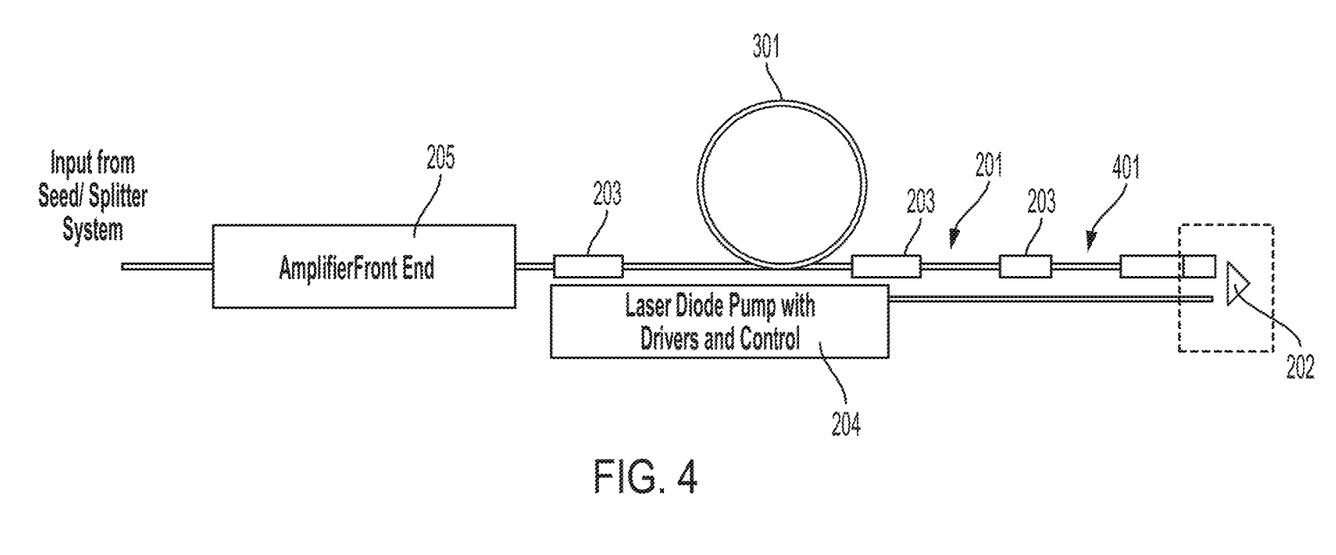
FIG. 4 illustrates yet another amplifier incorporating counter pumping according to an embodiment of the disclosure.

The more costly PCF fiber 201 can be further shortened by adding a third fiber as shown in FIG. 4. Comparing FIG. 4 to FIG. 3, the output end of the amplifier has an even larger core fiber 401. The core fiber 401 is added using double mode adapters 203 to allow counter pumped pump light to first pump the largest core fiber 401. The pump light that is unabsorbed then passes through the double mode adapter 203 and pumps the PCF fiber 201. The pump light that is unabsorbed from this stage then pumps the LMA fiber 301.

As the core signal light grows in intensity from the input to the output, the core diameter grows with the signal in a step-wise fashion such that the amount of nonlinearities that the amplifier sees is kept low while the cost of the system is greatly reduced. Although FIG. 4 is described with various fiber types, e.g., PCF fiber and LMA fiber, the fibers identified by 301, 201, and 401 can be replaced by a fiber that is continually tapered and that grows in an adiabatic manner from input to output to achieve the same effect.

Smaller core fibers are cheaper and have higher gain for a given pump power, but they exhibit higher non-linearities for a given power level. Larger core fibers on the other hand are the opposite. In some embodiments, it is advantageous to begin the amplifier with a smaller core gain fiber and end the amplifier with a larger core gain fiber. Pump power is better utilized when injected at the output end of the amplifier (counter pumped configuration) rather than the input end (co-pumped configuration). Some of the non-linearities such as self-phase modulation are governed by the B integral, which is the intensity of the light times the non-linear index of refraction with this product integrated over the length of the fiber. Since the non-linear coefficient is a constant, intensity is the variable to adjust. Therefore, embodiments of the disclosure have the intensity of the signal output light grow quickly right at the output of the amplifier.

Figure 5:
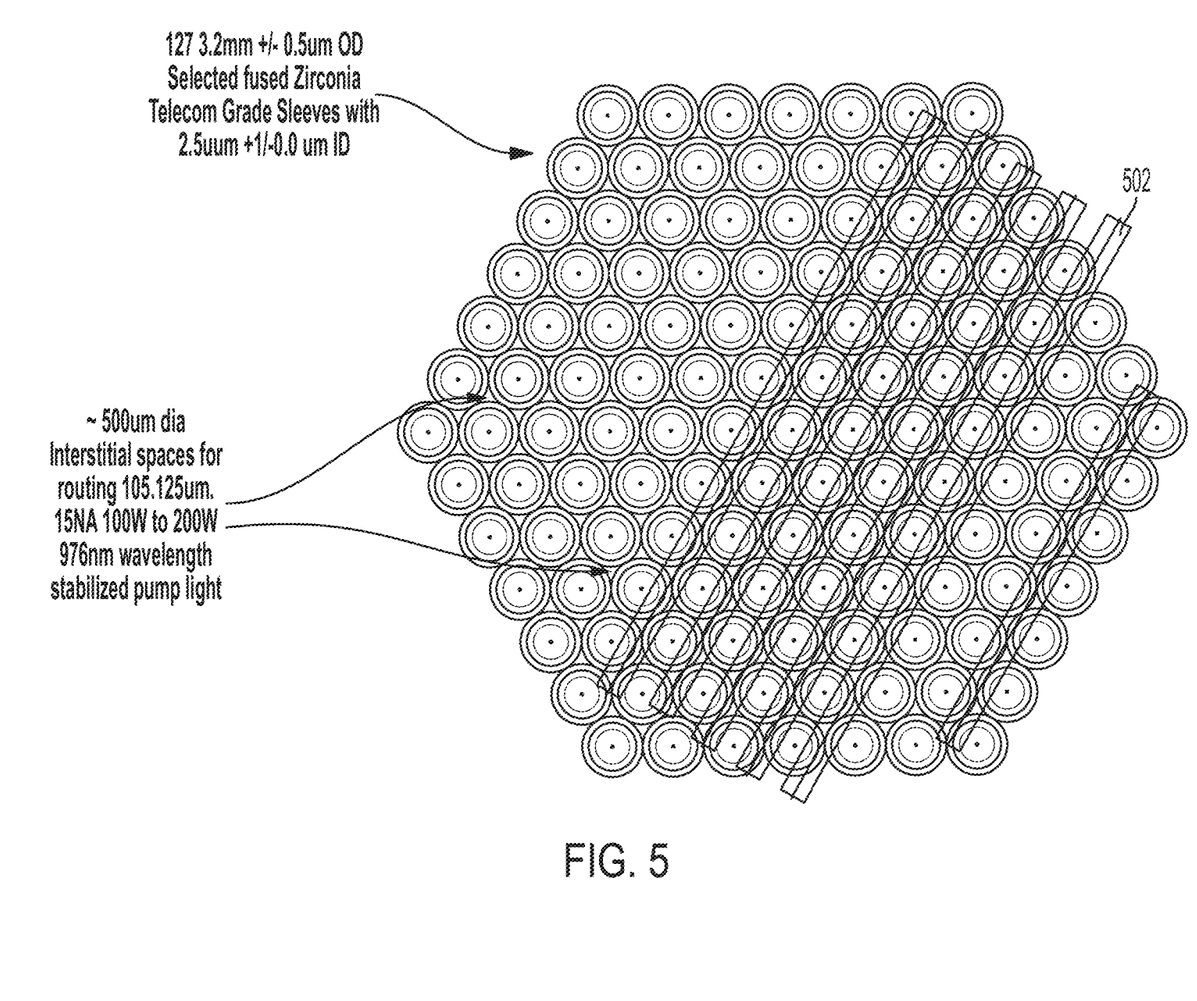
FIG. 5 illustrates an end view of an array of fiber amplifiers according to an embodiment of the disclosure.

Tapered end cap counter pumping according to embodiments of the disclosure are amenable to compact configurations that enable arrangement of precise arrays of fiber amplifiers. FIG. 5 illustrates an end view of such an array of fiber amplifiers according to an embodiment of the disclosure. The circles in FIG. 5 can represent fused Zirconia sleeves, such as those used in the telecom industry. The Zirconia sleeves can be 3.2 mm in outer diameter and 2.5 mm in inner diameter. These sleeves can be produced via a molding and fusing process in very large quantities and can be expensive. High tolerances can be selected for both the outer diameter and inner diameter by selecting sleeves with the proper tolerance. As such, sleeves with an interior diameter tolerance of +/−0.1 µm and an outer diameter tolerance of +/−0.5 µm are readily available. Within the sleeve is provided a fused Zirconia ferrule with a 2.5 mm outer diameter and an interior diameter that matches the signal gain fiber outer diameter, thus providing for a precise placement tolerance of the core of the fiber.

FIG. 5 also illustrates how these precise sleeves can be stacked to obtain a 1-D array, a 2-D square or 2-D hexagonal array such that the output cores of each fiber amplifier in the array can be aligned to a very high precision.

Due to the precise alignment of the shown hexagonal array depicted in FIG. 5, the pumping configuration of FIG. 1 can be implemented by placing long corner reflectors 502 along the array of fibers to serve as reversing prisms 104. The pump fiber 106 and second taper 105 of FIG. 1 can be positioned precisely by running these fibers into the interstitial spaces in the array, positioning the pump fiber 106 and the second taper 105 precisely relative to the reversing prism 104 and the first taper 102.

Figure 6:
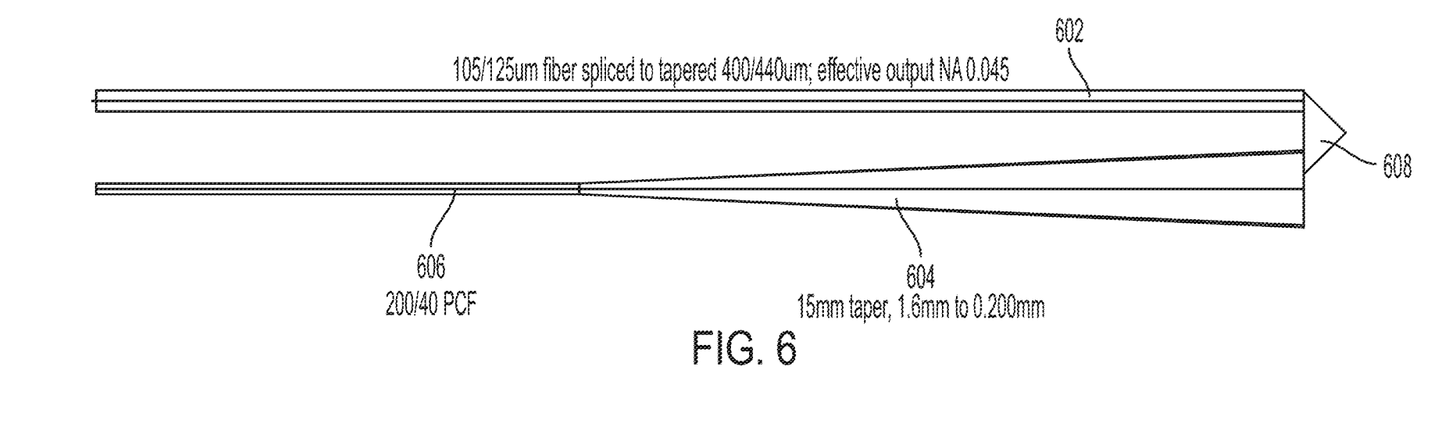
FIG. 6 illustrates a fiber optic assembly for counter pumping according to an embodiment of the disclosure.

FIG. 6 illustrates a fiber optic assembly for counter pumping according to an embodiment of the disclosure. The fiber optic assembly includes a pump fiber spliced unit 602 which includes a 105/125 µm fiber spliced to tapered 400/440 µm which has an effective output NA of 0.045, a reversing prism 608, a 200/40 µm PCF 606 and a 15 mm taper 604 that ranges from 0.200 mm to 1.6 mm.

Figure 7A:
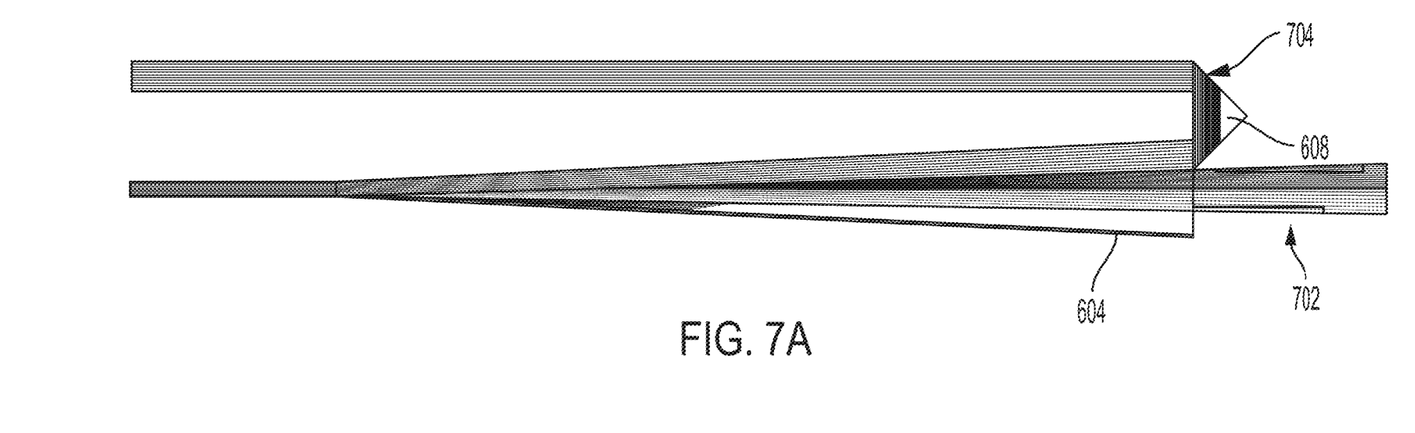
FIG. 7A illustrates beam patterns in the fiber optic assembly of FIG. 6.
Figure 7B:
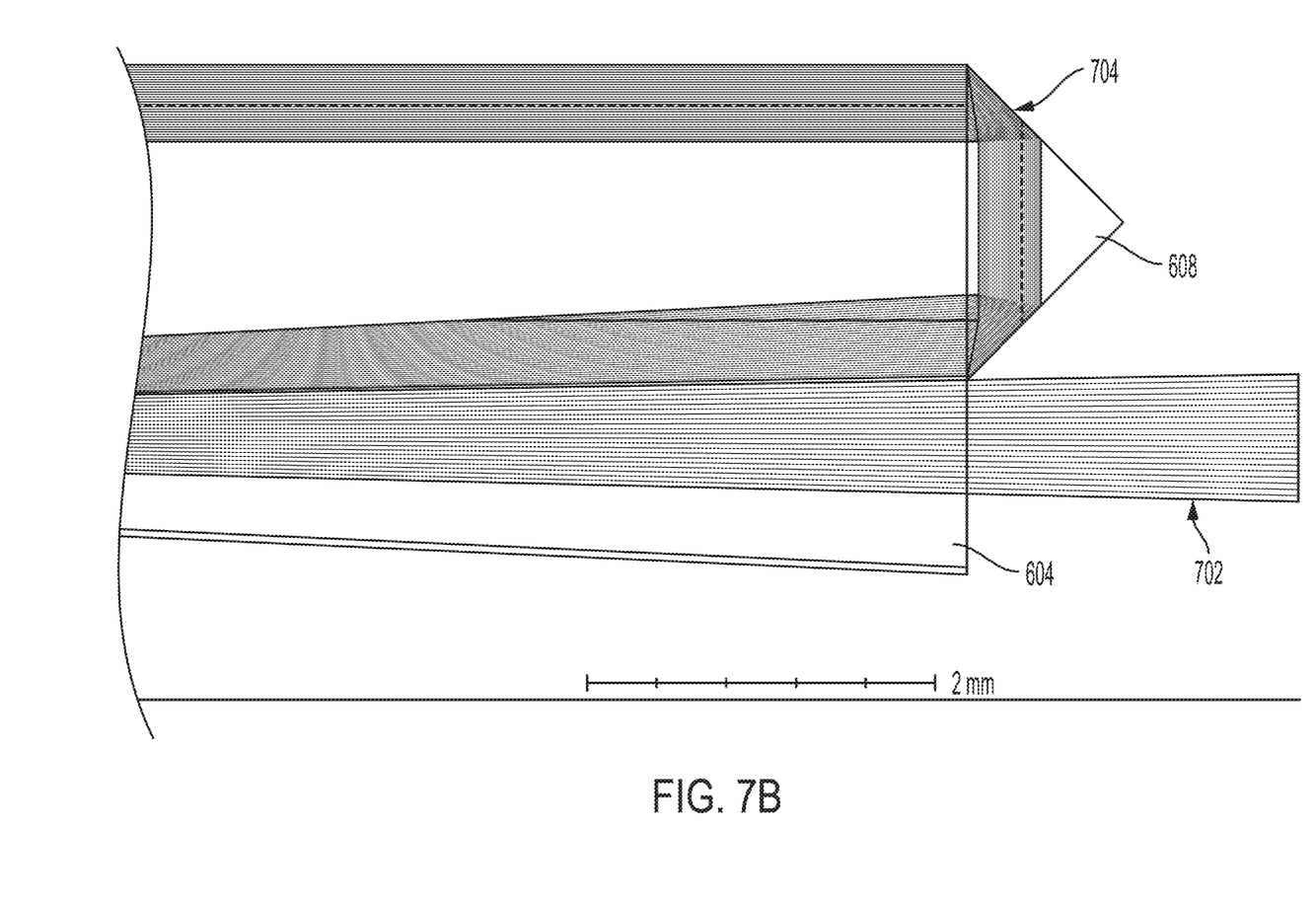
FIG. 7B is a zoomed in view of a portion of FIG. 7A.

FIG. 7A illustrates beam patterns in the fiber optic assembly of FIG. 6. Element 704 corresponds to beams from the pump, and element 702 corresponds to output beams. FIG. 7B is a zoomed in view of a portion of FIG. 7A, showing beams 704 and output beam 702. The beams 704 correspond to pump light from the pump fiber spliced unit 602 which is guided by reversing prism 608 through the taper 604 and to the PCF 606. The output beams 702 corresponds to the signal output from the PCF 606 which expands through the taper 604.

Figure 8A:
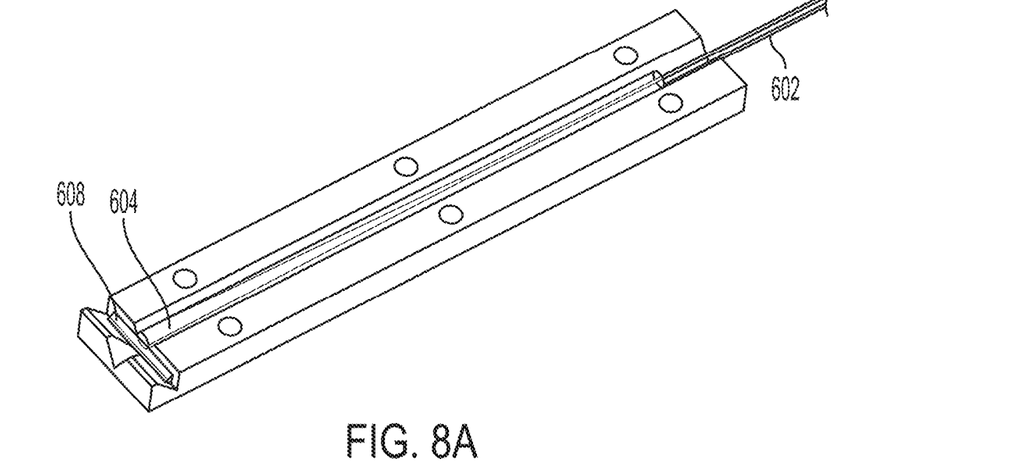
FIG. 8A illustrates a fiber optic assembly for counter pumping according to an embodiment of the disclosure.
Figure 8B:
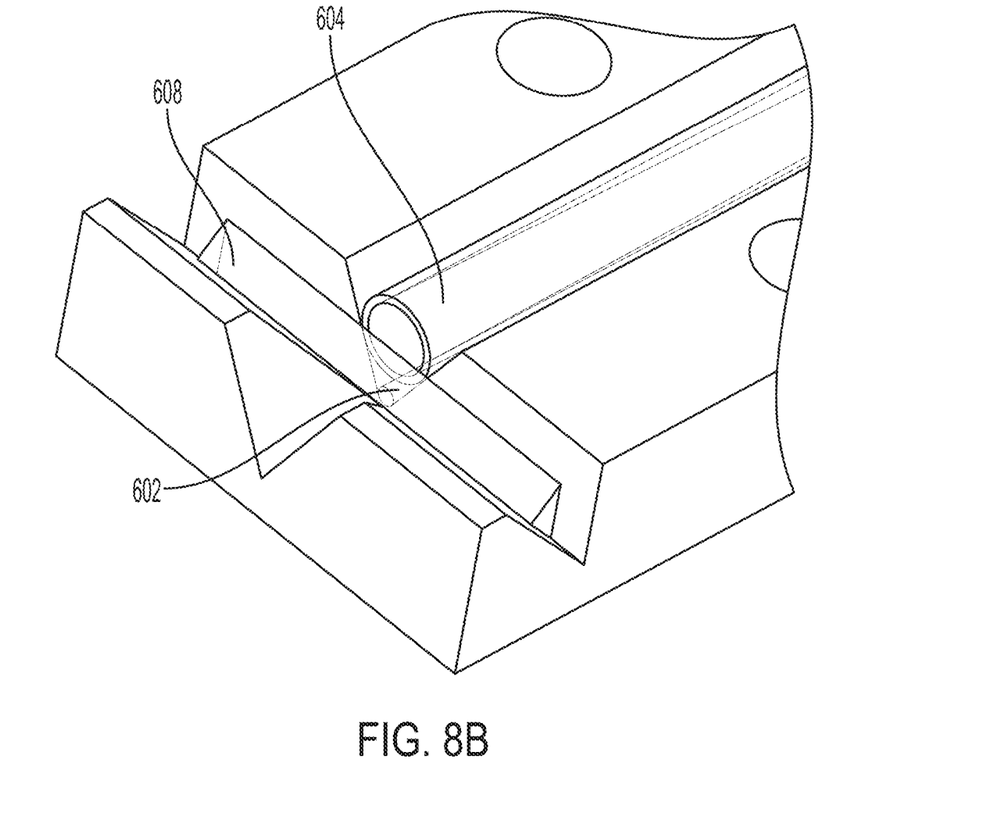
FIG. 8B is a zoomed in view of a portion of FIG. 8A.

FIG. 8A illustrates a fiber optic assembly for counter pumping according to an embodiment of the disclosure. FIG. 8B is a zoomed in view of a portion of FIG. 8A. As can be seen from these figures, a simple and stable support structure can be created with 2 simple "V" grooves holding a very precise optical alignment. In an example, the first "V" groove holds the pump fiber spliced unit 602 on the bottom and the PCF 606 and the taper 604 on top. The second "V" groove holds a reversing prism 608.

Figure 9:
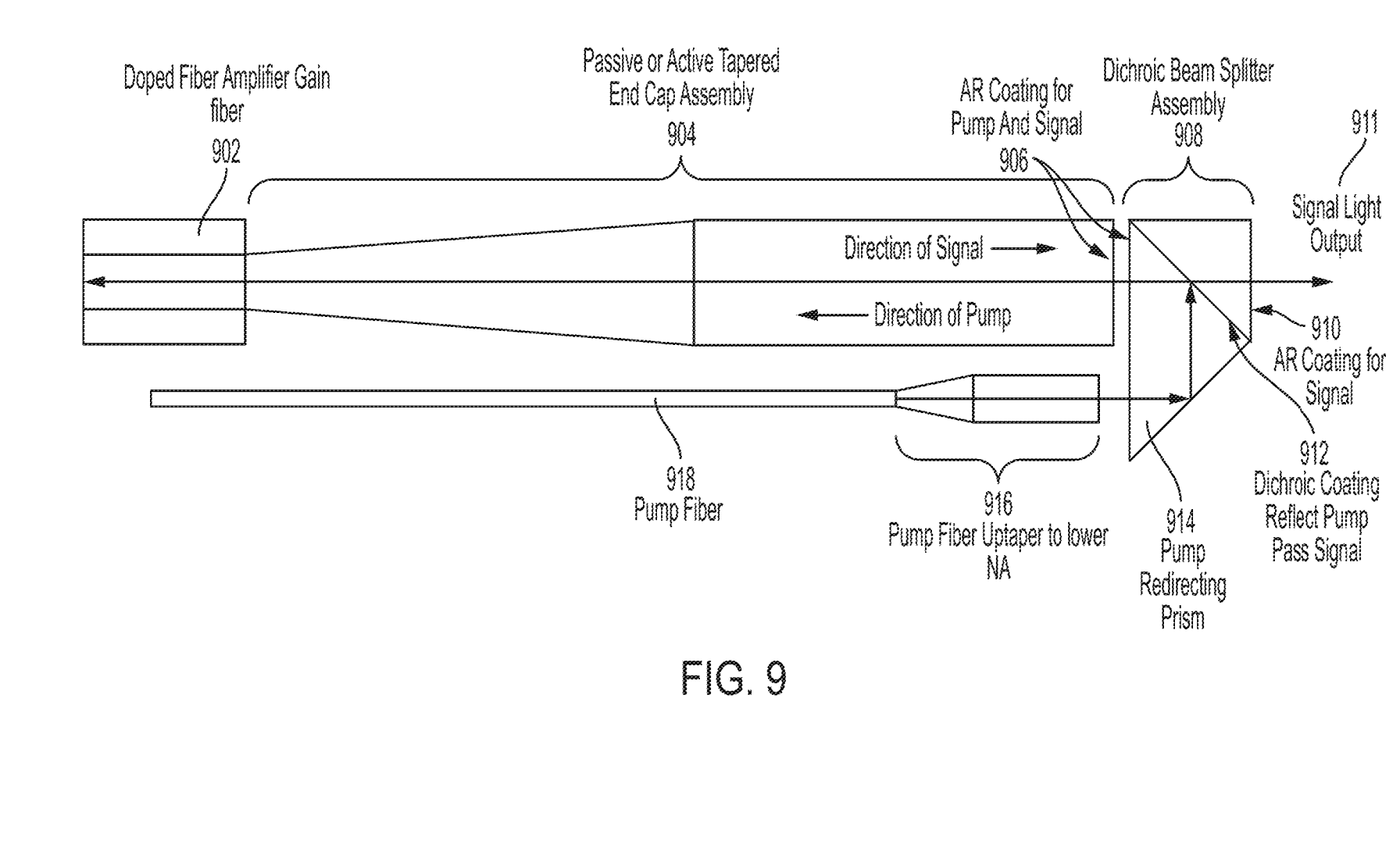
FIG. 9 illustrates a fiber optic assembly for counter pumping according to an embodiment of the disclosure.

FIG. 9 illustrates a fiber optic assembly for counter pumping according to an embodiment of the disclosure. The fiber optic assembly of FIG. 9 includes a doped fiber amplifier gain fiber 902, a tapered end cap assembly 904 which may be passive or active, an antireflective coating 906 for both pump and signal light, a dichroic beam splitter assembly 908, an antireflective coating 910 for signal light, a dichroic coating 912 for reflecting pump light but passing signal light 911, a pump redirecting prism 914, a tapered pump fiber 916, and a pump fiber 918.

In FIG. 1, the pump reversing prism 104 is placed as not to intersect the signal light exiting the first taper 102. This arrangement can be lower loss due to the fewer surfaces the signal will cross, but higher brightness requirements are allocated to the pump assembly. In contrast, FIG. 9 uses a dichroic beam splitting/pump redirecting assembly (the dichroic beam splitter assembly 908) to direct the pump light directly down the fiber axis instead of being offset to the side. The fiber optic assembly in FIG. 9 reduces the brightness requirement for the pump, allowing for higher pump powers to be utilized. In addition, the fiber optic assembly in FIG. 9 allows for the use of an active ion doped tapered end cap assembly as the tapered end cap assembly 904. The active ion doped tapered end cap assembly can provide additional amplifying energy to the overall laser assembly.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fiber optic assembly, comprising:
a gain fiber configured to output signal light;
a first taper configured to expand the signal light output by the gain fiber; and
a reflector configured to receive counter-pumping light and output the counter-pumping light into the first taper;
wherein the first taper is further configured to direct the counter-pumping light towards the gain fiber;
wherein the fiber optic assembly further comprises a pump fiber and a second taper for carrying the counter-pumping light to the reflector.

2. The fiber optic assembly according to claim 1, wherein the reflector is disposed relative to the first taper such that the reflector does not impede the expanded signal light output from the first taper.

3. The fiber optic assembly according to claim 1, further comprising a support structure having a first groove for holding the gain fiber and the first taper and a second groove for holding the reflector.

4. The fiber optic assembly according to claim 1, wherein the reflector is part of a dichroic beam splitter assembly and comprises a dichroic coating for reflecting the counter-pumping light and passing the signal light.

5. The fiber optic assembly according to claim 1, wherein the gain fiber is spliced to the first taper.

6. The fiber optic assembly according to claim 1, wherein the first taper is a tapered fiber or a tapered glass rod.

7. The fiber optic assembly according to claim 1, wherein a first end of the first taper interfacing with the gain fiber has a first diameter corresponding to a cladding diameter of the gain fiber, and a second end of the first taper interfacing with the reflector has a second diameter larger than the first diameter.

8. The fiber optic assembly according to claim 1, wherein the first taper comprises: a first section having a diameter which increases from a first value to a second value over the length of the first section; and a second section having a constant diameter.

9. The fiber optic assembly according to claim 1, further comprising:
an antireflective coating at an interface between the first taper and the reflector.

10. The fiber optic assembly according to claim 1, wherein the gain fiber is a large mode area (LMA) fiber or a photonic crystal fiber (PCF).

11. The fiber optic assembly according to claim 1, wherein the gain fiber is a composite fiber comprising a photonic crystal fiber (PCF) and a large mode area (LMA) fiber with a mode adapter interfacing the PCF fiber to the LMA fiber.

12. A fiber amplifier system, comprising:
an amplifier front end configured to pre-amplify light from a seed source and output the pre-amplified light to a first section of gain fiber;
a first mode adapter configured to connect the first section of gain fiber to a second section of gain fiber;
a laser diode pump for providing counter-pumping light through a pump fiber; and
a reflector assembly for directing the counter-pumping light from the pump fiber towards the first and second sections of gain fiber, wherein the reflector assembly comprises a first taper, a reflector, and a second taper.

13. The fiber amplifier system according to claim 12, wherein the second section of gain fiber comprises a photonic crystal fiber (PCF).

14. The fiber amplifier system according to claim 12, further comprising a second mode adapter configured to connect the second section of gain fiber to a third section of gain fiber, wherein the third section of gain fiber comprises a photonic crystal fiber (PCF).

15. The fiber amplifier system according to claim 14, further comprising a third mode adapter configured to connect the third section of gain fiber to a fourth section of gain fiber.

16. The fiber optic assembly according to claim 1, wherein the reflector comprises a reversing prism.

17. A fiber amplifier array, comprising:
a plurality of sleeves, wherein each sleeve comprises a gain fiber and a first taper;
a plurality of interstitial spaces disposed between respective sleeves of the plurality of sleeves; and
a plurality of reflectors, wherein each reflector is configured to direct counter-pumping light from at least one respective interstitial space to at least one respective first taper.

18. The fiber amplifier array according to claim 17, wherein the plurality of sleeves are arranged to form a 1-D array, a 2-D square array, or a 2-D hexagonal array.

19. The fiber amplifier array according to claim 17, wherein at least one reflector of the plurality of reflectors is configured to direct counter-pumping light from multiple interstitial spaces to multiple first tapers.

20. A fiber optic assembly, comprising:
a gain fiber configured to output signal light;
a first taper configured to expand the signal light output by the gain fiber; and
a reflector configured to receive counter-pumping light and output the counter-pumping light into the first taper;
wherein the first taper is further configured to direct the counter-pumping light towards the gain fiber;
wherein the fiber optic assembly further comprises a support structure having a first groove for holding the gain fiber and the first taper and a second groove for holding the reflector.

* * * * *